Jan. 21, 1969 P. J. MORE 3,422,812
ELECTRIC COOKING APPLIANCE WITH ADJUSTABLE CONTROLS HOUSING
Filed May 16, 1966

INVENTOR.
Philip J. More
BY
Attorney

United States Patent Office 3,422,812
Patented Jan. 21, 1969

3,422,812
ELECTRIC COOKING APPLIANCE WITH
ADJUSTABLE CONTROLS HOUSING
Philip J. More, Evanston, Ill., assignor to General Electric
Company, a corporation of New York
Filed May 16, 1966, Ser. No. 550,186
U.S. Cl. 126—211                                          4 Claims
Int. Cl. A47j 49/00

This invention relates to electric cooking appliances of the type intended to be installed in a kitchen counter of the conventional type having a horizontal working surface; in particular, the invention relates to the provision of a cooking appliance with a controls housing which may be adjusted to permit use of the appliance in working surfaces having different depths.

Cooking appliances, such as cooking tops for surface cookery, are often built into kitchen counters. In such installations, a rectangular section of the counter, including the full depth thereof, is removed; the cooking appliance is then inserted in the opening thus formed, and is supported by the remaining counter structure on each side. The usual cooking appliance has an upstanding hollow controls housing at the rear of the cooking top. It is conventional practice to make sure that, where a wall abuts the rear of the counter, the controls housing is completely at the rear of the cooking top against the wall; similarly, where an "island" counter installation is provided, the controls housing should be close to, but not directly at, the rear of the cooking top.

While the standard depth for kitchen counters is twenty-five inches from the front edge of the counter to the back edge thereof, this is a variable figure. Many such counters measure twenty-four inches, or even slightly less. This has posed a problem for the manufacturer of cooking appliances intended to be built into such counters: the front of the cooking appliance shoul dbe at least coextensive with the front of the counter, and the housing at the back should be entirely against the wall, that is, coextensive with the back edge of the counter, or at a preselected distance from the back of an island installation.

A further point is that since the upstanding controls housing is hollow, and contains within it the various electrical controls for effecting surface cooking, a dismantling of the structure may be necessary for servicing purposes. It is important for the sake of economy, and to avoid as much as possible any damaging of the control equipment, and dismantling and assembly of the controls housing relative to the surface unit be effected quickly and easily, preferably from above and in front of the counter in which the cooking appliance is positioned.

It is therefore an object of my invention to provide a cooking range for insertion into a surface counter wherein the controls housing for the range may be adjusted in the front-to-rear direction to make up for variations in the depth of the counter.

It is a further object to provide such a structure wherein the controls housing may easily be disassembled and reassembled from above and in front.

In one embodiment of my invention, I provide a cooking appliance, adapted for installation in a counter having a horizontal working surface, wherein a rectangular cooking top is adapted to be secured in an appropriate space in the counter top. A pair of spaced, aligned parallel slots are formed in the cooking top near the back thereof, extending in a front-to-rear-direction. Extending vertically upwardly through each slot above the cooking top is a female threaded member which is horizontally slidable in the slot but is not otherwise movable.

The cooking appliance has, in the usual manner, a hollow controls housing which is intended to extend across the rear of the cooking top. In the top surface of the housing there is provided a pair of openings respectively in alignment with the slots. A pair of headed male threaded members extend down through the openings respectively to an extent limited by the engagement of the head of each such male member with the housing top surface. The male members are threaded into the female members; as a result, the housing is held down against the cooking top at the rear thereof, in the selected position, regardless of minor variations in the depth of the working surface.

In addition, this relationship of the parts permits the housing to be quickly removed by loosening of the male threaded members, so that the housing may then be lifted and positioned for servicing of the controls therewithin. Once the servicing is achieved, the reassembly of the housing at the back of the cooking top is effected in the same manner as before.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawing.

In the drawing, FIGURE 1 is a front view in perspective of a cooking range embodying my invention and positioned in a kitchen counter;

FIGURE 2 is an exploded view in perspective, from the left front, of the rear of the cooking range of FIGURE 1;

FIGURE 3 is a view along line 3—3 of FIGURE 1; and

FIGURE 4 is an exploded view in perspective of part of the structure of my invention.

Figure 1:
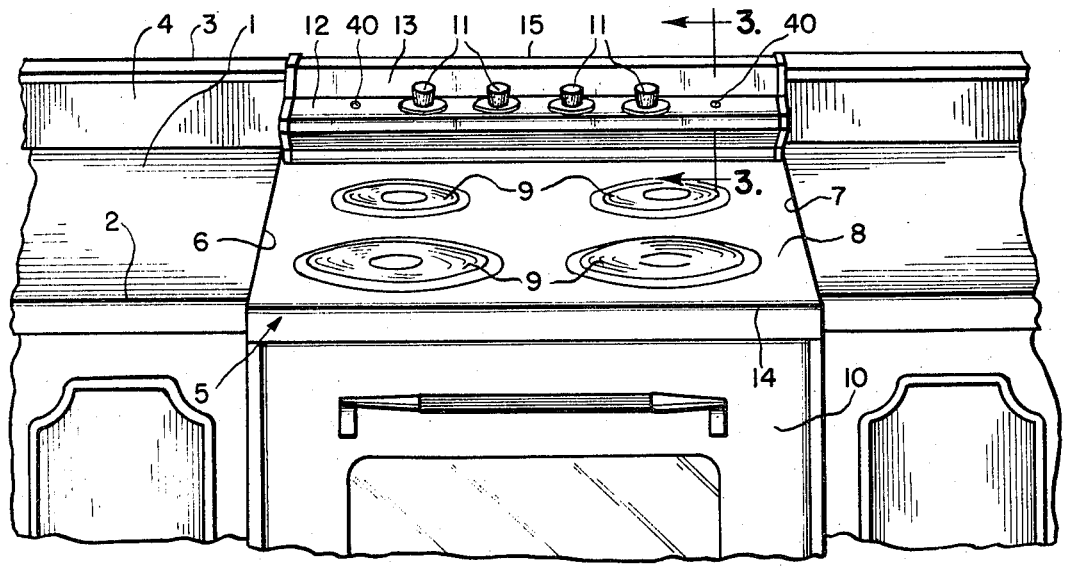
Figure 1:
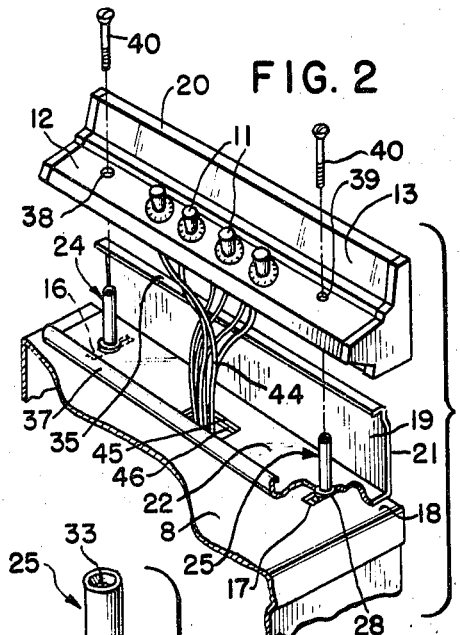
Figure 1:
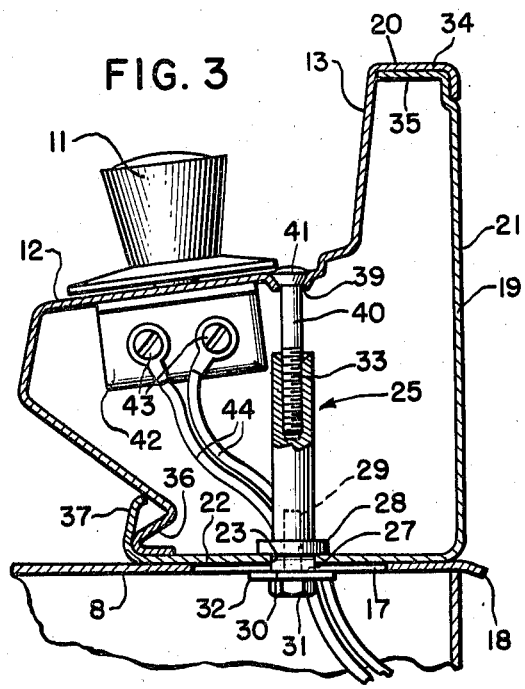
Figure 1:
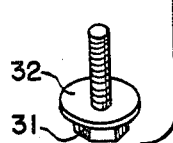

Referring now to FIGURE 1, there is shown a kitchen counter 1 having a front edge 2 and a rear edge 3 which is defined, as is quite often the case, by an upstanding backsplasher 4. The conventional practice is to have the rear edge 3 of the backsplasher abut the kitchen wall.

To accommodate a cooking appliance, generally indicated by the numeral 5, a rectangular opening is made in counter 1 by cutting it away along the lines 6 and 7 to provide an opening of sufficient width that the cooking appliance 5 may be inserted thereinto and fit relatively snugly. It will be understood that there are conventional means for concealing the junction lines 6 and 7 where the appliance and the counter meet so that there will be no raw edges showing, but that, rather, an attractive finished appearance will be provided.

The cooking appliance 5 will normally include a cooking top portion 8 having four surface cooking units 9. If so desired, the appliance may also include an appropriate oven structure, generally indicated by the numeral 10, directly beneath the surface section 8, although it will be understood that the surface section 8 may be provided alone, and that an entirely separate oven may be provided at a remote location. In order to achieve controlled heating of the surface units 9, control members 11 are provided extending from an upper surface 12 of a box-like controls housing 13 provided at the rear of cooking top 8.

It will be understood that, in different kitchens, counter 1 may be of different depths; that is, the distance from front edge 2 to back edge 3 may vary somewhat. It will also be understood that the front edge 14 of the cooking top should be at least as far forward as the front edge 2 of the counter, so as to hide completely the cuts 6 and 7 that were required for insertion of the cooking top 8. For this reason, the depth of the cooking top from its front edge 14 to the rear edge 15 of control box 13 may also be required to vary to some extent.

In order to permit this variation in the total front-to-back dimension of the cooking appliance, while at the same time providing for ready disassembly and reassembly of the controls housing, the structure now to be described is provided. A pair of slots 16 and 17 are formed near the back edge 18 of cooktop 8, extending in spaced, aligned, parallel relationship to each other. Slots 16 and 17 each extend in a front-to-rear direction, and are of any length which lets them be hidden from view in both extreme positions of the controls housing 13. In a structure presently being provided, a length of a little over one-and-a-half inches has been found highly satisfactory.

The controls housing 13 includes two separate sheet metal portions 19 and 20, with portion 19 providing the back 21 and the bottom 22 of the housing, and portion 20 providing the top and front thereof including the surface 12 in which manual controls 11 are positioned. The bottom surface 22 is flat so that it may rest properly on the cooktop 8. Bottom surface 22 has a pair of square openings formed therein in alignment with the slots 16 and 17. Referring specifically to FIGURE 3, one of these openings, denoted by the numeral 23, is shown in connection with slot 17.

Identical female threaded members 24 and 25 are positioned in slots 16 and 17 respectively. Referring to FIGURES 3 and 4, the specific construction of these members will be described in particular connection with member 25. Member 25 includes a lower portion 27 of preferably square cross-section (see FIGURE 4). When portion 27 is positioned within the slot 17, member 25 may slide within the slot from one end thereof to the other, but cannot rotate on its axis. Portion 27 is also intended to be positioned extending through the openings 23 in surface 22 previously described. At the upper end of portion 27 there is a shoulder 28 which is larger than the opening 23; thus, member 25 may be passed through opening 23 and slot 17 from above until the shoulder 28 engages surface 22.

An axially extending, internally threaded section 29 is provided in member 25 extending up from the bottom 30 thereof. A suitable threaded member 31 having a large head 32 may be threaded into section 29 until head 32 abuts the bottom of member 25. When this arrangement is provided, the member 25 is maintained in the substantially vertical position shown. It may either be pulled up from the slot—large head 32 engaging the underside of cooktop 8 prevents this—nor may it be passed down through the openings since shoulder 28 prevents such motion.

It will be understood that, while a particular structure is described for member 25, any modification which achieves the result of retaining member 25 in slot 17 for horizontal motion only may be provided. For instance, member 25 might be formed of spring material, with a bottom section which would pass through slot 17 and opening 23 when compressed, and which would expand to its normal dimensions beneath slot 17 to achieve the same purpose as head 32 of member 31.

As member 25 is moved back and forth horizontally in slot 17, it will carry with it the member 19 since the opening 23 fits quite snugly about section 27 of member 25. Thus, part 19 may be positioned in any desired relationship to cooktop 8 within the limitations of the slot 17.

It will be understood that the position shown in FIGURE 3, wherein the end 18 of the cooktop actually projects past the back 21 of member 19, is used only where the range is inserted in an "island" counter, and the rear edge 18 is intended to match the remainder of the counter. For installations where the back 21 is to be positioned against a wall, the assembly of member 25 and member 19 would be moved backwardly, i.e., to the right as viewed in FIGURE 3, into abutting relationship with the wall.

Member 20 is designed to have an interfitting relationship with member 19, as best shown in FIGURE 3. This is achieved in any suitable fashion. For instance, as shown, portion 34 of member 20 may overlie portion 35 of member 19, and portion 36 of member 20 may fit within an upstanding flange 37 formed at the front of surface 22 of section 19. When the two sections, 19 and 20, are thus positioned in this relationship, a pair of openings 38 and 39 are provided in alignment with the slots 16 and 17, and the openings 23. As a result of this alignment, when a conventional male threaded member 40 is inserted through opening 39 it is automatically positioned so as to be received in an internally threaded portion 33 formed in the top of the member 25. It is then merely necessary to turn the threaded member 40; as a result of the engagement of the head 41 thereof with the sides of opening 39, the top section 20 will be tightened down onto the lower section 19, and both controls housing sections will be secured to the cooktop 8.

Completing the description of the structure, it will be observed in FIGURE 3 that, secured to the underside of surface 12 by any suitable means, there is a control structure, generally shown by the numeral 42, having terminals 43 to which electric wires 34 are joined. Each of the members 11 is provided with this arrangement. The wires extend through an opening 45 in surface 22, and an opening 46 in cooktop 8. Below the cooktop, wires may be connected in the conventional way to an appropriate source of power and to the individual units 9 so as to provide the desired control thereof. The opening 46 is made large enough so that, over the entire span of movement permitted by slots 16 and 17, the openings 45 and 46 coincide with each other to provide a sufficiently large opening for the wires to pass through without any danger of their being squeezed or pinched.

In the assembly of the controls housing 13 to cooktop 8, first the member 19 is secured to the cooktop 8. This is effected by the insertion from above of each of members 24 and 25 through openings 23 and the slots 16 and 17 until shoulder 28 abuts surface 22. Each member 25 is then secured in that position by the threading in of member 31 to the position shown in FIGURE 3. At this point the member 19 is slidably secured to the cooktop 8 by member 25. Member 20 may then be positioned on member 19, and male threaded members 40 passed through openings 38 and 39 into mating relation with female members 24 and 25. Members 40 may be screwed in loosely, and the assembly of members 19 and 20 forming the controls housing 13 moved until it is in the correct position. Screws 40 may then be tightened to fasten the assembly of the controls housing in position.

If it is necessary to service the controls in housing 13, all that is necessary is for members 40 to be unscrewed out of their relationship with members 24 and 25. The upper part 20 may then be tilted forward so as to provide complete and easy access to the controls. Then, when the servicing is complete, it is simply necessary to replace member 20 on member 19 and tighten members 40 into members 24 and 25 once again.

It will be understood that, while in accordance with the patent statutes I have described what at present is considered to be the preferred embodiment of my invention, it will be obvious to those skilled in the art that various changes and modifications may be made therein without departing from the invention, and it is therefore intended in the appended claims to cover all such equivalent variations as fall within the true spirit and scope of the invention.

What I claim as new and desire to secure by Letters Patent of the United States is:

1. A cooking appliance adapted for installation in a space provided therefor in a counter having a horizontal working surface, comprising:

(a) a rectangular cooking top adapted to be secured in said space, said cooking top having at least two spaced aligned parallel slots formed therein adjacent the rear thereof and extending in a front-to-rear direction;

(b) a pair of female threaded members respectively positioned in said slots so as to be horizontally slidable therein, each said female threaded member having a portion engaging the underside of said cooking top adjacent its associated slot, and being retained in said slot so as to extend vertically upward from said cooking top;

(c) a hollow controls housing formed to extend across the rear of said cooking top, said housing having a pair of openings formed in a top surface thereof in alignment with said slots respectively;

(d) and a pair of male threaded members adapted to extend down through said openings, to an extent limited by engagement of said heads with said housing top surface, into mating relation with said female threaded members respectively;

(e) whereby said housing is held down against said cooking top at the rear thereof, regardless of minor variations in the depth of said working surface and is quickly removable and reassembled from the front of said working surface.

2. The appliance defined in claim 1 wherein said housing has a bottom surface with a wire-receiving opening therein and said cooking top has a wire-receiving opening therein, said two wire-receiving openings being positioned and sized so as to overlie each other in all possible positions of said controls housing thereby to permit the free passage of wires from within said controls housing to the underside of said cooking top.

3. The appliance defined in claim 1 wherein said controls housing comprises a base section and an upper section adapted to overlie said base section in interfittting relationship therewith so as to define a controls housing space therebetween, said upper section including said pair of openings in said top surface, said bottom section having a pair of openings formed therein in alignment with said slots and with said openings in said top surface, said female threaded members extending respectively up through and openings in said bottom section and said male threaded members extending down respectively through said openings in said top surface.

4. The appliance defined in claim 3 wherein each said female threaded member includes a removable section providing a shoulder at the lower end thereof to limit upward movement of said female threaded member, and a second shoulder intermediate the ends thereof to limit downward movement thereof, whereby vertical movement of said female threaded members is prevented without impairing their slidable relationship within said slots.

References Cited

UNITED STATES PATENTS

| D. 180,627 | 7/1957 | Sundberg. | |
| D. 180,626 | 7/1957 | Sundberg. | |
| 3,320,944 | 5/1967 | Hoppe | 126—214 |

BERNARD G. GILHEANY, *Primary Examiner.*

FRED E. BELL, *Assistant Examiner.*

U.S. Cl. X.R.

126—214